United States Patent [19]

Simone, Jr.

[11] Patent Number: 5,094,499
[45] Date of Patent: Mar. 10, 1992

[54] MOTORIZED TRUCK BED COVER

[76] Inventor: Anthoney L. Simone, Jr., 2914 Chestnut Rd., Edgewater, Md. 21037

[21] Appl. No.: 715,635

[22] Filed: Jun. 14, 1991

[51] Int. Cl.$^5$ .................................................. B60P 7/02
[52] U.S. Cl. ...................................... 296/100; 49/340; 49/339; 49/347
[58] Field of Search ................. 296/100; 49/324, 340, 49/347, 339

[56] References Cited

U.S. PATENT DOCUMENTS

| 2,989,340 | 6/1961 | Penner | 296/100 |
|---|---|---|---|
| 3,489,456 | 1/1970 | Klanke | 296/100 |
| 3,762,762 | 10/1973 | Beveridge et al. | 296/100 |
| 3,785,698 | 1/1974 | Dean et al. | 296/100 |
| 4,079,989 | 3/1978 | Robertson | 296/100 |
| 4,083,596 | 4/1978 | Robertson | 296/100 |
| 4,101,162 | 7/1978 | Koehn | 296/100 |

FOREIGN PATENT DOCUMENTS 193847 11/1937 Switzerland ............... 49/339

Primary Examiner—Margaret A. Focarino
Assistant Examiner—Gary C. Hoge
Attorney, Agent, or Firm—John B. Dickman, III

[57] ABSTRACT

A raising and lowering mechanism including an electric powered winch having a cable connected to the cross bar of pivotal lever arms to raise and lower a pivotally hinged rigid cover. The winch cable is payed over a pulley system positioned at a height equal to or greater than the pivot points of the lever arms for providing a mechanical advantage.

4 Claims, 2 Drawing Sheets

MOTORIZED TRUCK BED COVER

BACKGROUND OF THE INVENTION

The present invention relates in general to a truck bed cover and more particularly a truck bed cover which is hinged at one end and motorized to open and close with a remote switch.

Heretofore, truck bed covers were either a soft removable cover or a hard cover that pivoted to open. The soft cover provided no protection against vandalism and as a consequence hard covers have replaced them where articles of value are stored in the trucks. There are several U.S. patents directed to truck bed covers of interest to the present invention. The inventor is aware of the following U.S. patents:
U.S. Pat. No. 3,675,885 issued to SHUTE
U.S. Pat. No. 3,765,717 issued to GARVERT
U.S. Pat. No. 3,743,345 issued ot ECKMAN
U.S. Pat. No. 4,328,989 issused to CHILDERS
U.S. Pat. No. 4,533,171 issued to
U.S. Pat. No. 4,768,824 issued to ANDONIAN Of the above U.S. patents, the patent issued to CHILDERS is the only patent directed to a motorized system for raising a hard cover of a cargo truck bed. There is disclosed an electric motor and chain drive for raising and lowering a hard cover vertically, using telescopic columns connected to the chain drive system.

Also of interest is U.S. Pat. No. 4,533,171 which is directed to a trailer with a pivotal top. The top is hand operated with telescopic gas pistons to hold the top in an open position. A similar hand operated pivotal cover with telescopic pistons is shown in the patent to Andonian.

SUMMARY OF THE INVENTION

In accodance with this invention a cover apparatus for the bed of a pick-up truck is provided. The cover apparatus includes a cover of rigid construction hinged to the truck bed at one end and a mechanism for raising and lowering the cover. The cover has a waterproof surface to protect the contents of the pick-up cargo bed.

The mechanism for raising and lowering the cover comprises an electric winch and pulley system. A pivotal lever arm means connected to a cable from the winch, whereby the lever arm means, which have wheels on the free ends, are pivoted vertically to raise and lower the cover. A critical feature of the mechanism is the positioning of the pulley system. The pulley or pulleys must be at a height to pivot the lever arm means about a pivot means to effect the raising and lowering of the cover.

DESCRIPTION OF THE INVENTION

Figure 1:
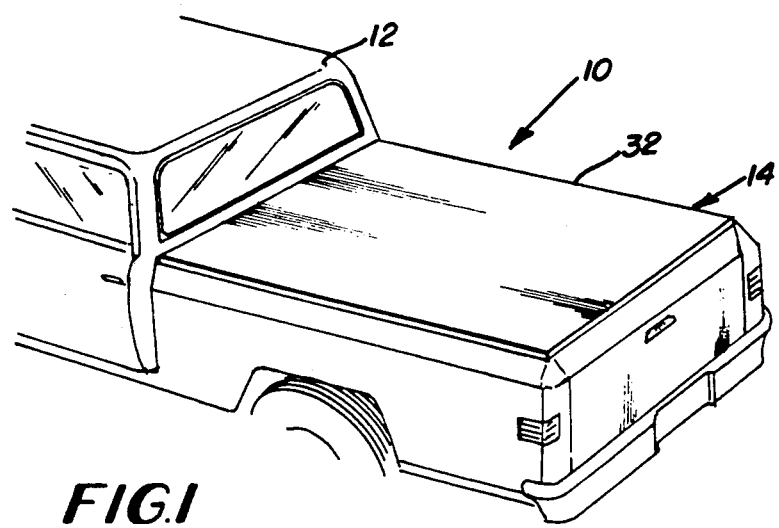
FIG. 1 is a perspective view of a cargo bed cover of the invention in the closed position.
Figure 2:
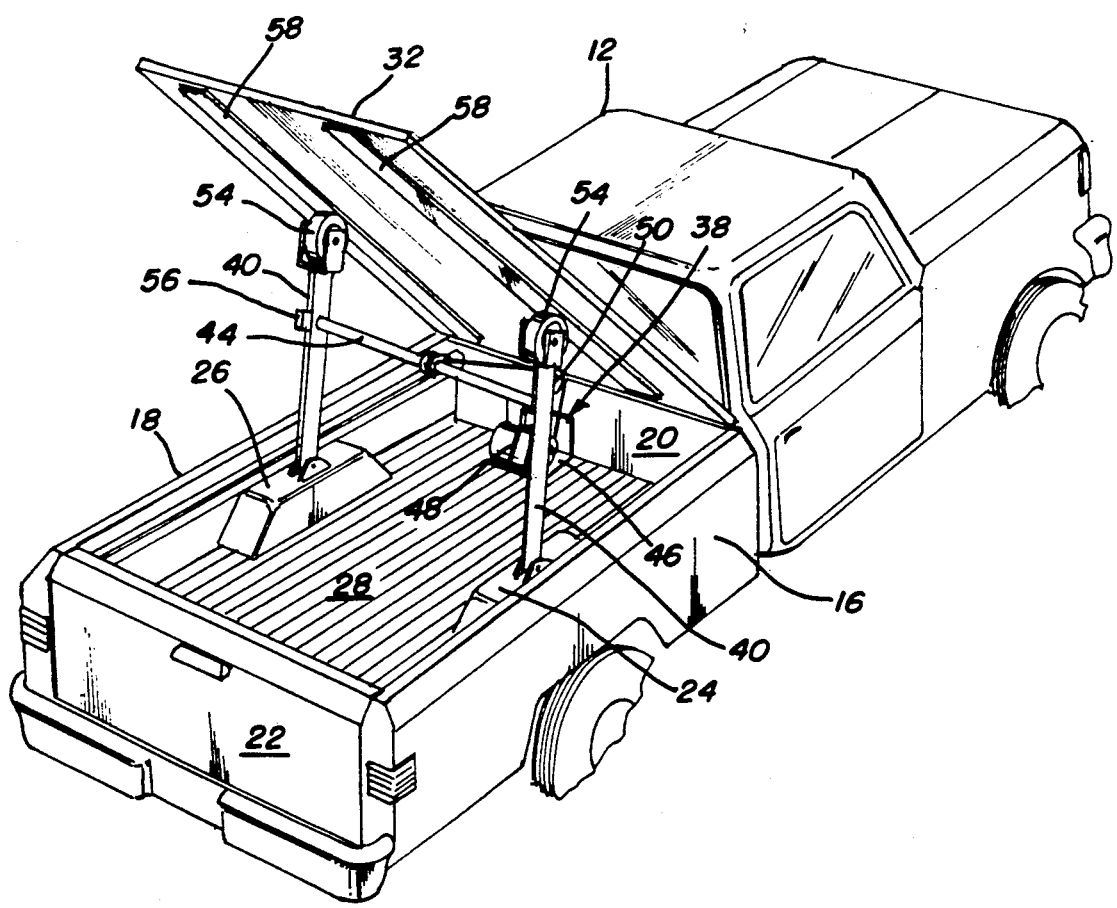
FIG. 2 is a perspective view of a cover of the invention in the raised position.
Figure 3:
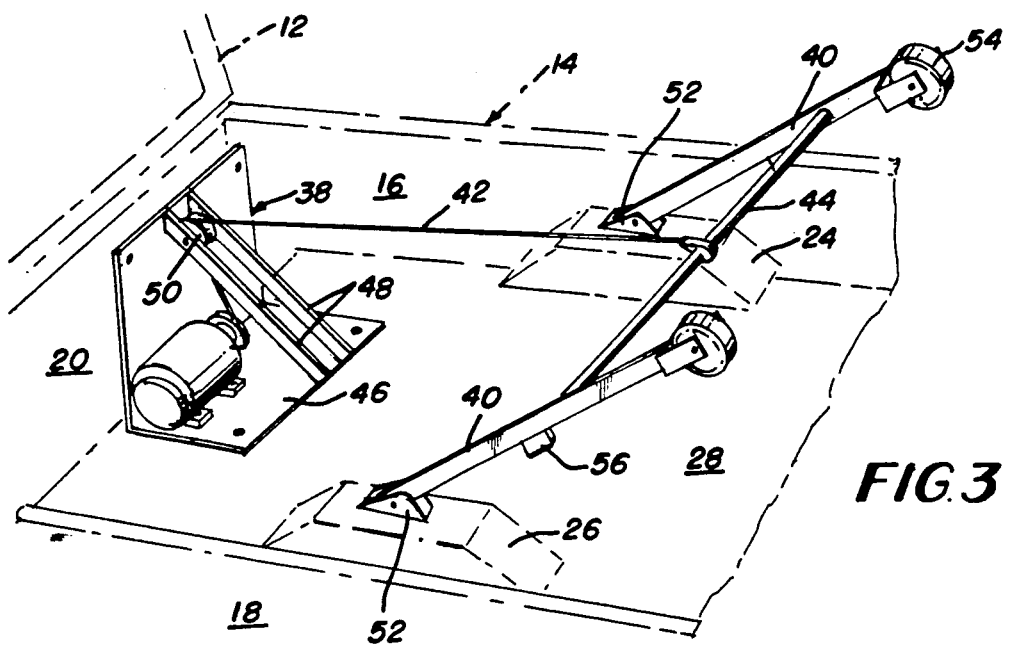
FIG. 3 is a perspective view of a raising and lowering mechanism of the invention.
Figure 4:
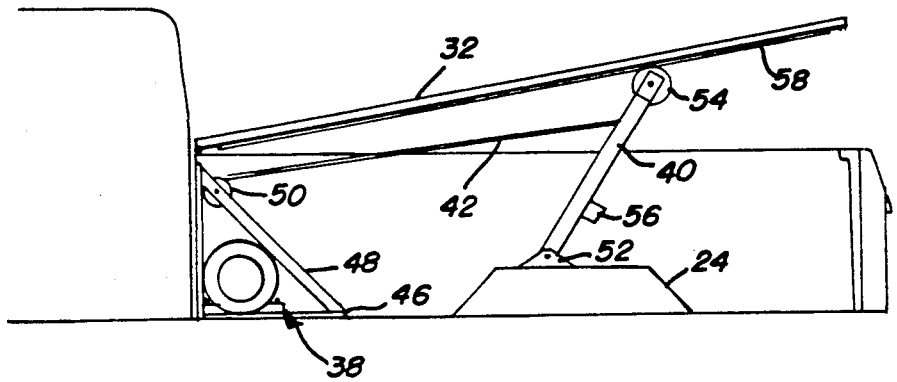
FIG. 4 is a side view of the cover and raising and lowering mechanism of the invention.
Figure 5:
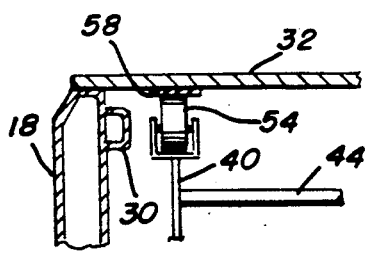
FIG. 5 is a partial cross sectional view of the cover and raising and lowering mechanism.

Referring to the drawings, FIGS. 1-6, there is shown a truck 10 having a cab 12 and a cargo bed 14. The cargo bed 14 has side walls 16 and 18, a stationary end wall 20, and a pivotal tailgate 22. FIG. 3 shows wheel wells 24 and 26 which occupy a portion of a bed 28. The walls have a box-type reinforced top edge 30, one of which is shown in FIG. 5.

FIGS. 1 and 2 show a rigid planar hard cover 32 to close and secure the cargo bed 14 against weather conditions and possible thievery. The hard cover 32 is hinged to end wall 20. While a molded plastic cover with reinforcement ribs for rigidity is preferred, a wooden cover with a waterproof laminate is acceptable. Other materials such as fiberglass and sheet metal may also be used.

A raising and lowering mechanism 36 includes an electric winch 38 and a pair of lever arms 40 mounted in the cargo bed 14. The electric winch 38 has a d. c. motor connected to the reel of the winch by gearing. The winch has an aircraft cable 42 that extends from the winch 38 to a cross bar 44 connecting the pair of lever arms 40. The winch assembly is mounted on an L-shape support 46 that bolts to the truck bed 28 and end wall 20. A pair of braces 48 are welded to the L-shaped support 46 at an angle and separated from each other to support a pulley 50. Aircraft cable 42 is payed over pulley 50 and connected to the cross bar 44 by a shackle.

Figure 6:
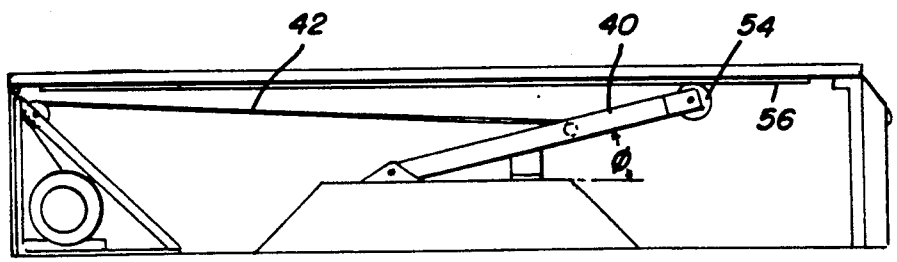

Lever arms 40 are pivotally connected via supports 52 on wheel walls 24, 26. Each lever arm 40 has a roller 54 on its free end and rest 56 which contacts the surface of the well 24, 26. The roller 54 is pressed against the underside of rigid cover 32 to roll along the underside of the cover as it is raised and lowered. Rest 56 is mounted at or about midway of the lever arm 40 such that the rest, which is of a height equal to the support 52, supports the lever arm at a slight incline with the pivotal point at support 52 being the lowest point of the incline. A close look at FIG. 6 shows the lever arm 40 at an incline with roller 54 pressing against the cover 32. The purpose of the incline is to insure that the lever arm 40 does not rest parallel to the cable 42 since at the angle the pulling force by the cable on the cross bar 44 would be without the benefit of mechanical advantage. Likewise, should the angle between the lever arm 40 and cable 42 be beyond parallel there would be a mechanical disadvantage. Whereas, an angle less than parallel, as shown, provides a mechanical advantage for smoother operation.

FIG. 5 shows the cargo bed side wall 18 and reinforced top edge 30 with cover 32 resting on it. The lever arm 40 and roller 54 are shown with the roller pressing against the underside of the cover. There is a steel or plastic track 58 for the roller to roll along.

Controls for operating the pivotal cover 32 are mounted in the truck cab and include an "off-on" switch and a joy stick for raising and lowering the cover. In operation, to raise the cover 32 the switch is "on" and the joy stick is moved to the raised position activating the electric winch 38. The operation of the winch 38 is to wind the cable 42 onto the winch thereby pulling the lever arms 40 about the pivots of supports 52 and raising the lever arms and the cover vertically. To accomplish the desired pull of the lever arms 40, the pulley 50 must be higher than the pivotal points of supports 52 so that cable 42 is pulling with a mechanical advantage.

While only one embodiment of the invention is shown, it is undersood that one skilled in the art may realize other embodiments. For example, the location of lever arm supports and the length of the lever arms can be adjusted to different cargo beds. Therefore, one should look to the drawings, description and claims for a complete understanding of the invention.

The winch can also be used in the regular manner for outside work.

I claim:

1. A mechanism for raising and lowering a pivotally hinged rigid cover of a truck cargo bed where the cargo bed has side walls, an end wall and a tailgate, and the cover is hinged to the end wall to pivot vertically comprising:

a. a pivotal lever arm means mounted on said truck cargo bed said lever arm means having a pivotal end and a free end, said free end contacting the rigid cover on it's underside to provide force for raising the cover and to control the lowering of the cover;

b. an electric power means for pivoting said lever arm means including a winch with a cable connected to said lever arm means; and, c. an L-shaped support for supporting said electric power means, an angled bracket means fixed on said L-shaped support for supporting a pulley at a height above the pivotal end of said lever arm means, whereby said cable provides a force for pivoting said lever arm means.

2. A mechanism for raising and lowering a pivotally hinged cover as in claim 1, wherein said pivotal lever arm means is mounted on wheel wells in the cargo bed, and having rest support means on said pivotal lever arm means which rest on the wheel wells to limit the angle of said lever arm means at rest to a slight incline, with the pivot point of said pivotal lever arm means being at the lowest end of the incline.

3. A mechanism for raising and lowering a pivotally hinged cover as in claim 2 wherein said pivotal lever arm means includes a pair of lever arms with roller means on the free ends, a cross bar connecting said lever arms together.

4. A mechanism for raising and lowering a pivotally hinged planar cover as in claim 3 wherein said rigid cover has roller tracks on the underside for guiding said lever arm rollers.

* * * * *